(12) United States Patent
Arnaud

(10) Patent No.: US 9,598,550 B2
(45) Date of Patent: Mar. 21, 2017

(54) METHOD OF DEVULCANIZING VULCANIZED RUBBER

(71) Applicant: SOCIETE PLYMOUTH FRANCAISE, Feyzin (FR)

(72) Inventor: Daniel Arnaud, Saint Etienne (FR)

(73) Assignee: SOCIETE PLYMOUTH FRANCAISE, Feyzin (FR)

( * ) Notice: Subject to any disclaimer, the term of this patent is extended or adjusted under 35 U.S.C. 154(b) by 150 days.

(21) Appl. No.: 14/406,196

(22) PCT Filed: Jun. 10, 2013

(86) PCT No.: PCT/FR2013/051329
§ 371 (c)(1),
(2) Date: Dec. 5, 2014

(87) PCT Pub. No.: WO2013/182830
PCT Pub. Date: Dec. 12, 2013

(65) Prior Publication Data
US 2015/0148435 A1    May 28, 2015

(30) Foreign Application Priority Data
Jun. 8, 2012 (FR) ...................................... 12 55360

(51) Int. Cl.
| | |
|---|---|
| *C08J 11/04* | (2006.01) |
| *B29B 17/00* | (2006.01) |
| *C08J 11/10* | (2006.01) |
| *B29C 47/60* | (2006.01) |
| *C08J 3/00* | (2006.01) |
| *C08L 7/00* | (2006.01) |
| *C08L 9/00* | (2006.01) |
| *B29K 21/00* | (2006.01) |
| *B29K 105/24* | (2006.01) |

(52) U.S. Cl.
CPC ............... *C08J 11/10* (2013.01); *B29B 17/00* (2013.01); *B29C 47/6087* (2013.01); *C08J 3/005* (2013.01); *C08L 7/00* (2013.01); *C08L 9/00* (2013.01); *B29K 2021/00* (2013.01); *B29K 2105/24* (2013.01); *C08J 2307/00* (2013.01); *C08J 2309/00* (2013.01); *C08J 2309/02* (2013.01); *C08J 2309/06* (2013.01); *C08J 2311/00* (2013.01); *C08J 2315/00* (2013.01); *C08J 2319/00* (2013.01); *C08J 2321/00* (2013.01); *C08J 2323/16* (2013.01); *C08J 2323/34* (2013.01); *C08J 2333/00* (2013.01); *C08J 2375/04* (2013.01); *C08J 2383/04* (2013.01); *C08L 2207/20* (2013.01); *Y02W 30/62* (2015.05); *Y02W 30/702* (2015.05)

(58) Field of Classification Search
CPC ................................... C08J 11/06; C08J 11/08
USPC ................... 521/40, 41, 44.5, 45.5
See application file for complete search history.

(56) References Cited

U.S. PATENT DOCUMENTS

| | | | |
|---|---|---|---|
| 4,607,796 A | | 8/1986 | Enikolopov et al. |
| 4,968,463 A | * | 11/1990 | Levasseur ........... B29B 17/0042 264/122 |
| 6,133,413 A | | 10/2000 | Mouri et al. |

FOREIGN PATENT DOCUMENTS

| | | |
|---|---|---|
| EP | 0887372 A1 | 12/1998 |
| FR | 2947555 A1 | 1/2011 |
| WO | 0205965 A1 | 1/2002 |
| WO | 2004031277 A1 | 4/2004 |
| WO | 2012017414 A1 | 2/2012 |

OTHER PUBLICATIONS

International Search Report issued Jul. 16, 2014 re: Application No. PCT/FR2013/051329; U.S. Pat. No. 4,607,796 A, Khait "New solid-state shear . . . ", EP 0 887 372 A1, U.S. Pat. No. 6,133,413 A and WO 2004/031277 A1.
Klementina Khait "New solid-state shear extrusion pulverization process for used tire rubber recovery", Rubber World, May 1997, vol. 216, No. 2, p. 38-39 XP008160141.

* cited by examiner

*Primary Examiner* — Terressa Boykin
(74) *Attorney, Agent, or Firm* — Cantor Colburn LLP

(57) ABSTRACT

A method of devulcanizing vulcanized rubber is described. The method includes steps of: (a) providing at least one vulcanized rubber composition; (b) grinding the vulcanized rubber into chips or pellets; (c) mixing the ground rubber obtained from step (b) in such a way as to homogenize the form and temperature of same; (d) carrying out a non-degrading mechanical treatment on the mixed rubber at the end of step (c) to obtain a polymeric composite. Also described is a thermoplastic material and an elastomeric mixture which comprise, in the formulation of same, at least one polymeric composite obtained by this method of devulcanization.

9 Claims, 1 Drawing Sheet

METHOD OF DEVULCANIZING VULCANIZED RUBBER

TECHNICAL FIELD

The present invention relates to a method of devulcanizing a vulcanized rubber.

BACKGROUND

Within the scope of the present invention, it is meant by vulcanized rubber, a raw elastomer (for example polyisoprene) which has been subjected to a chemical method during which it has been formulated with additives of which a vulcanizing agent (for example sulfur) allowing the vulcanization and having undergone a thermal treatment in such a manner as to create bridges between the macromolecules of said elastomer to form a three-dimensional network.

It results from the vulcanization a less plastic material but more elastic than the starting raw elastomer. Meaning that as a result of an appropriate constraint, the three-dimensional network becomes deformed. It resumes its initial state when the constraint is removed, and thus thanks to the presence of bridges formed during the vulcanization which can be modeled by springs.

The vulcanization is an irreversible transformation, achieved at temperatures generally ranging between 150 and 350° C., as beyond this value of 350° C., most elastomers would become damaged. The damage would translate by a change in the visco-elastic properties of the elastomer with, in general, an increase of the viscous component and a decrease of the elastic component.

After vulcanization, the vulcanized rubber is infusible. In fact, the vulcanization is the achieving of chemical bonds, generally sulfur-based, between the macromolecular chains of the elastomer. The origin of these chemical bonds is the rupture of a residual double bond of a macromolecule. It is worth noting that the vulcanized elastomer still has, within it, numerous residual double bonds, which are just as many sites which can be later used for new chemical reactions.

The fact that the vulcanized rubber is infusible later prevents any new shaping of an article manufactured in such a material, which may be required, for example, in the case of producing a non compliant article or for an article at the end of life or even for recycling production offcuts.

This is why, to this day, the only recycling operations commonly applied on articles manufactured from vulcanized rubber are grinding or shredding in order to obtain a powder, a crumb or an aggregate of elastic material. The elastic material thus obtained may then be used as elastic filler or diluted filler in various products. In no case can it be chemically bonded with a polymeric matrix.

Thus, in light of the limited industrial applications of ground vulcanized rubber and especially due to the fact that the shaping operation is impossible after the vulcanization, it can be easily understood that the recycling of articles manufactured from vulcanized rubber remains a technical and economic issue of major importance, and thus with regard to the permanent increase in production of such articles in vulcanized rubber.

Certainly, it is known to subject a very harsh chemical and thermal treatment during which the three-dimensional network of the vulcanized rubber is dismantled. However, the product obtained from such a treatment, called "regenerated rubber", has less efficient physical and mechanical properties than the original vulcanized rubber. This limits its usage in production methods requiring materials which should comply with drastic requirements. This is why, this method of recycling vulcanized rubber is not fully satisfactory.

Furthermore, several scientific works have been conducted on methods of partial thermo-mechanical degradation of a vulcanized rubber, in other words called "partial devulcanizing methods". In this respect, patents describe such methods which implement partial and monitored degradations of a vulcanized rubber by an important simultaneous shearing and a pressure increase.

By way of examples, it may be cited the international application WO 02/05965 A1 and the French patent application FR 2 947 555 A1 which, however state methods requiring a lot of energy.

Furthermore, the technologies introduced in these two patent applications are tricky to implement and exhibit a low reproducibility by virtue of the phenomena inherent to a thermo-mechanical treatment which initiates partial degradations of the elastomer.

In fact, it is known by the skilled person that the phenomena of deterioration to the macromolecular chains lead to creating free radicals of which the life expectancy is zero. This principle, known by the name Quasi-steady-state-approximation (abbreviated "QSSA"), specifies that the free radicals will disappear by recombining quasi instantaneously with other free radicals present in the immediate vicinity thereof. Hence, there is creation of local micro-domains of which the structure is random and non reproducible. Likewise, this reaction which is primed at high temperature, will continue according to a kinetic which is much lower at room temperature, leading to an instability in time of the properties of the thus devulcanized rubber. In other words, the product resulting from this thermo-mechanical treatment is chemically degraded and unstable and hence not fully satisfactory.

Furthermore, the international application WO 2012/017414 A1 describes a thermo-mechanical treatment of elementary particles of rubber in an extruder of co-rotary twin-screw type. The extruder used is equipped with long screws, of which the ratio of length of the screws on the diameter of the screws is higher than 64. The thermal treatment is carried out at one single temperature ranging between 35° C. and 350° C., preferably of the order of 270° C. The shape of the different elements of the screw allow to make the rate of shear vary and thus create locally the self-heating required for the rupture of the bridges resulting from the vulcanization.

However, the method described in this international application WO 2012/017414 A1 does not allow achieving an optimal devulcanizing. In fact, it exhibits the following two major drawbacks:

Owing to the typology of the applied treatment (cutting the vulcanization bridges by increasing the rate of shear in an enclosure maintained at constant temperature), it is not to be considered to have a homogenization in temperature of the material during the shearing operation allowing the devulcanization thereof.

Similarly, it is not possible to immediately lower the temperature of the material after devulcanizing and thus block the start of thermal degradation pertaining to the local presence of a temperature higher than the decomposition temperature of the rubber.

The material thus obtained does not exhibit a homogenous chemical structure, but deteriorated micro-domains, rendering any later re-vulcanizing operation very uncertain.

It is also worth noting that the material which exits from the extruder is at a high temperature which is a function of the inner temperature of the extruder and the shearing to which it has been subjected. This material thus often exhibits the drawbacks of being sticky and self-adherent. If its temperature is very high (namely higher than 250° C. or 350° C. according to the rubber treated), it is liable to become deteriorated in an irreversible manner.

Moreover, it should be noted that the partial thermo-mechanical degradation methods such as that of the international application WO 2012/017414 A1 lead to the rupture of the majority of the bonds resulting from the vulcanization and the aforementioned residual double bonds, of which the main focus has been detailed above, thus rendering any later re-vulcanizing operation impossible.

Thus, it has been noticed from the prior art described above that none of the developed technologies has allowed to find a fully efficient, cost-effective and easy to implement solution for recycling articles in vulcanized rubber.

BRIEF SUMMARY

The present invention brings a remedy to the set of drawbacks detailed above pertaining to recycling vulcanized rubber, and more particularly to those inherent to implementing a thermo-mechanical degradation method, by proposing a method of devulcanizing a vulcanized rubber allowing to obtain a composite polymeric material partially or totally devulcanized and especially, unlike the aforementioned known technologies, non degraded.

Thus, the invention provides a method of devulcanizing a vulcanized rubber which comprises the following steps:
a) providing at least one vulcanized rubber;
b) grinding the vulcanized rubber into chips or aggregates;
c) kneading the ground rubber obtained from step b) in such a manner as to homogenize it in shape and temperature.
d) achieving a non degrading mechanical treatment on the kneaded rubber obtained from step c) for obtaining a polymeric composite.

During step c) of the method, the mechanical constraints accumulated during the vulcanization of the rubber are dissipated.

The step c) of kneading is advantageously achieved by subjecting the ground rubber obtained from step b) to a low rate of shear, namely preferentially ranging between around $100\ s^{-1}$ and $500\ s^{-1}$.

The step d) of non degrading mechanical treatment is achieved in such a manner that the vulcanization bonds are destroyed and the free radicals resulting from these breaks are recombined while preserving the residual double bonds of the vulcanization in order to obtain a polymeric composite.

The step d) of non degrading mechanical treatment is advantageously achieved by subjecting the kneaded rubber obtained from the step c) to a high rate of shear, preferably ranging between around $10^3\ s^{-1}$ and $10^6\ s^{-1}$.

The polymeric composite obtained from the method according to the present invention in an entirely advantageous manner, owing to its particular chemical structure, has possibilities of binding by bonds of covalent or ionic type with other polymeric materials including rubbers.

This polymeric composite is a completely different product from the crumb obtained from the aforementioned process of grinding and shredding articles manufactured in vulcanized rubber. The crumb is in fact a rubber homogenate which remains in the vulcanized state, and hence in other words is not a devulcanized product.

This polymeric composite is flexible, hardly elastic and has an as aspect comparable to a rubber or a mixture of unvulcanized rubbers. More particularly, it comes in the form of a homogenous non granular paste, of which the viscosity can be measured according to the temperature.

Moreover, this polymeric composite obtained from the devulcanizing method according to the invention has as a property, in the manner of an unvulcanized rubber or mixture of rubbers (in other words of a mixture of raw rubbers), to swell significantly more than the vulcanized rubber used as starting product of said method, when it is plunged into a solvent such as cyclohexane.

However, it has been perfectly established that the degree of swelling of a rubber or a mixture of rubbers in the cyclohexane is inversely proportional to its cross-linking rate. In other words: the higher the devulcanizing rate, the more important the degree of swelling in cyclohexane.

As part of the present invention, it has been measured:
the degree of swelling of a mixture based on natural vulcanized rubber (NR) from tires of heavy trucks. It was of 182.
The degree of swelling of the polymeric composite obtained from the devulcanizing method which was achieved from this mixture based on natural vulcanized rubber (NR). It was of 354.

This increase in the degree of swelling, namely from 182 to 354, clearly demonstrates that the polymeric composite obtained from the devulcanizing method according to the invention is a devulcanized rubber material.

Furthermore, on account of the specificities of the devulcanizing method according to the invention, the polymeric composite thus obtained still has residual double bonds of the vulcanized starting rubber which has been devulcanized and which will still be available during a vulcanizing operation on said polymeric composite.

The polymeric composite may be used in an alloy with thermoplastic polymers, but also with vulcanizable rubbers. In this last case, the polymeric composite is chemically bonded after vulcanization to the matrix formed by the rubber. It may, in rubber formulations, be partially substituted by a "virgin" rubber mixture, and thus without alteration of the mechanical and physical-chemical properties resulting from the mixture of the different constituents of said rubber formulations.

In addition, due to its pasty and homogenous aspect conferring it a certain viscosity, the polymeric composite obtained from the devulcanizing method according to the invention exhibits the advantage of being able to be used, as active component ready to be vulcanized in combination with a raw mixture in all technologies for transforming rubber which are in particular extrusion, injection, calendering, and thus without modifying the aspect or mechanical features of the end parts.

This is why, one purpose of the present invention is also a thermoplastic material obtained by combining at least one thermoplastic polymer with at least one polymeric composite obtained according to the method of the invention.

Moreover, another purpose of the present invention is an elastomeric mixture comprising around 1% to 50%, preferably 10% to 50% in weight of polymeric composite obtained from the method. Advantageously, the elastomeric mixture further comprises around 1% to 50%, preferably 10% to 50%, in weight of ground vulcanized rubber which may come in the form of a crumb.

In a preferred manner, said elastomeric mixture comprises at least one elastomer selected from the group constituted by the polyisoprene rubber (IR), the natural rubber (NR), the isobutene isoprene rubber (IIR), the ethylene-propylene-diene monomer rubbers (EPDM), styrene-butadiene rubbers (SBR), the polychloropropene rubber (CR), the nitrile butadiene rubber (NBR), the hydrogenated nitrile butadiene rubber (HNBR), chlorosulphonated polyethylene (CSM), silicones, polyurethanes, acrylic rubber (ACM).

The present invention also relates to an article manufactured from vulcanized rubber comprising at least one polymeric composite obtained according to the method of the invention.

Finally, a last purpose of the invention is an installation for devulcanizing vulcanized rubber which implements the method according to the invention and which will be described more fully after the detailed description of the method below.

According to the method of the invention, the vulcanized rubber to be devulcanized may be chosen from among all types of rubbers and their mixtures which have undergone a vulcanization process. It may comprise for example:
polyisoprene rubber (IR),
natural rubber (NR),
polybutadiene rubber (BR),
ethylene-propylene rubber (EPR),
styrene-butadiene rubber (SBR),
nitrile butadiene rubber (NBR),
isobutene isoprene rubber (IIR),
hydrogenated nitrile butadiene rubber (HNBR),
ethylene-propylene-diene monomer rubber (EPDM),
polychloropropene rubber (CR),
polyurethanes,
chlorosulphonated polyethylene (CSM),
acrylic rubber (ACM),
silicones.

From among all these aforementioned types of rubber, two groups are to be distinguished.

There is a first group comprising the rubbers which are not resistant at high temperatures of the order of 250° C. In other words, these rubbers are known to become degraded starting from temperatures of the order of 250° C. In this first group there are:
natural rubber (NR),
polybutadiene rubber (BR),
polyisoprene rubber (IR),
styrene-butadiene rubber (SBR),
polyurethanes non resistant at temperatures higher than 250° C.

There is a second group comprising the rubbers which are resistant up to very high temperatures, of the order of 250° C. to 350° C. In other words, these rubbers are known to not become degraded, even when they are subjected to very high temperatures of the order of 250° C. to 350° C. However, beyond 350° C., these rubbers also become degraded.

In this second group there are:
ethylene-propylene rubber (EPR),
nitrile butadiene rubber (NBR),
isobutene isoprene rubber (IIR),
hydrogenated nitrile butadiene rubber (HNBR),
ethylene-propylene-diene monomer rubber (EPDM),
polychloropropene rubber (CR),
chlorosulphonated polyethylene (CSM),
acrylic rubber (ACM),
silicones,
polyurethanes resistant up to temperatures of 250° C. to 350° C.

The polyurethanes may be part of the first group and the second group according to the chemical structure of the considered polyurethane.

As part of the present invention, it is very advantageous and important to take into account these properties of resistance or not to the heat of the rubbers which are subjected to this devulcanizing method.

In fact, during this devulcanizing method, it is sought to optimize the output and speed of the machine implementing the steps c) and d) of the method. This optimization is promoted by a rise in maximum temperature which however, must not exceed the final temperature from which the rubber or the mixture of rubbers subjected to the devulcanizing method becomes degraded. However, according to the considered rubbers, whether they belong to the first group or to the second group, this maximum temperature (or range of maximum temperatures) will not be the same.

In other words, for the rubbers of the second group which are resistant to higher temperatures than the rubbers of the first group, it may be allowed to reach during the method according to the invention higher maximum temperatures than with rubbers from the first group, and thus without the risk of degrading the material, and having the advantage of a higher productivity.

Hence, it convenes to properly reconcile the following parameters: the increase in productivity of the method thanks to an implementation of the steps of the method at high temperatures while making sure to not exceed the decomposition temperatures of the rubbers subjected to this devulcanizing method, in such a manner as not to obtain a degraded devulcanized polymeric composite which would be much less exploitable in the embodiments detailed above.

This is why, that in the description of the method according to the following invention, it has been taken into account the features of the decomposition temperature of the rubber (or mixture of rubbers) subjected to this method, namely that it is distinguished according to whether the rubber belongs to the first group or to the second group, in such a manner as to obtain the better productivity of the method according to the considered rubber to be devulcanized.

As part of the present invention, the vulcanized rubber to be devulcanized may be constituted by non compliant manufactured articles, by production offsets, or by articles at the end of life which have been collected after sorting operations carried out in drop-off centers. Thus, the method according to the invention is perfectly appropriate for recycling articles manufactured in vulcanized rubber.

In step a) of the method according to the invention, it is provided at least one vulcanized rubber. In other words, it may comprise a vulcanized rubber or a mixture of vulcanized rubbers (the mixture of rubbers having been subjected to a vulcanization process).

In the rest of the description of the method according to the invention, there is mention of vulcanized rubber. It should be of course understood that it may comprise not only a vulcanized rubber (namely a rubber having been mixed with appropriate additives to allow the vulcanizing of this rubber) but also of a mixture of rubbers which has been vulcanized (namely several rubbers which have been mixed with appropriate additives to allow the vulcanizing of this mixture of rubbers).

During step b) of the method according to the invention, the vulcanized rubber to be devulcanized is ground into chips or aggregates of small dimensions, preferably of the order of 5 mm to 15 mm. The size of the chips or aggregates is not a critical parameter for the method according to the invention. It must be compatible with the device for supplying the vulcanized rubber comprised by the equipment implementing the method according to the invention.

After step b) of grinding, the ground vulcanized rubber is preferably brought to room temperature, of the order of 25° C.

In a preferred embodiment of the invention, after step b) of grinding and prior to step c) of kneading, the vulcanized rubber is subjected to in a first tooling to a temperature ranging:

between 25° C. and 200° C., preferably of 25° C. to 150° C., when the vulcanized rubber is a rubber of the first group detailed above, between 25° C. and 350° C., when the vulcanized rubber is a rubber of the second group detailed above.

This first tooling may comprise a co-rotary twin-screw extruder of which the shape of the screws corresponds in a preferred manner to a segment of transfer of type SE or SK (elements allowing to exert a lateral thrust on the material). The length of the screws advantageously ranges between 4 and 8 times the diameter of the screws, preferentially around 4 times the diameter of the screws.

The profile of the screw elements of the extruder allows maintaining constant the outputted volume of vulcanized rubber, for example by a feeder (in particular a gravimetric feeder or a volumetric filler) placed upstream, and conveying it towards a second tooling which constitutes the kneading tooling described hereinafter.

The step c) comprises a setting at a temperature without constraints, during which the following physical phenomena take place:

the dissipation of the mechanical constraints accumulated in the vulcanized rubber during the vulcanizing thereof or in other words a relaxing of the constraints of the vulcanized rubber, the rise in homogenous temperature of the vulcanized rubber without the primer of a thermal degradation, the homogenization of the vulcanized rubber, so that the temperature, the shape (namely the size of the aggregates) and the stress level are identical in every aspect of the vulcanized rubber.

In an embodiment of the invention, the step c) of kneading is achieved in a second tooling of which:

the temperature of the tooling ranges between 100° C. and 250° C., preferably between 125° C. and 250° C., when the vulcanized rubber is a rubber of the first group detailed above, the temperature of the tooling ranges between 100° C. and 350° C., when the vulcanized rubber is a rubber of the second group detailed above.

Advantageously, the second tooling comprises a co-rotary twin-screw extruder.

In this embodiment of the step c), the homogenizing of the temperature within the ground rubber, as well as the shaping thereof are then ensured by the profile of the screws.

The screw elements are preferentially transfer segments of type SE or SK or elements allowing by reverse-pumping to increase the residence time of the material in the tooling. These elements allowing the reverse-pumping are known under the name CME (Continuous Mixing element).

Moreover, in this second tooling, the length of the screws advantageously ranges between 12 and 36 times the diameter of the screws, preferentially around 28 times the diameter of the screws.

The step d) of the method according to the invention allows bringing sufficient energy for achieving the rupture of the bonds resulting from the vulcanization comprised by the vulcanized rubber and the recombination of the free radicals thus formed by the formation of new low energy bonds, and thus thanks to mechanisms such as nucleophilic substitutions.

The energies binding the main chemical functions present in a vulcanized rubber are resumed in table 1 below.

TABLE 1

Binding energy of the main groups present in a vulcanized rubber

| Bond | Binding energy |
| --- | --- |
| C—C | 376 kJ/mol |
| C—S | 362 Kj/mol |
| S—S | 372 Kj/mol |
| C—H | 418 Kj/mol |
| S—H | 364 Kj/mol |
| C—N | 308 Kj/mol |

The most "fragile" bonds which are the first ones to be destroyed during the step d) of the method according to the invention are the —S—S and C—N bonds, as their binding energies are the weakest of those mentioned in table 1.

Advantageously, the non-degrading mechanical treatment of the step d) comprises a shearing.

The shearing leading to a strong inner temperature rise of the treated vulcanized rubber, it is very important to take into account this phenomenon and to specifically regulate the temperature during this step (d), in order to contain any thermal degradation issue pertaining to an excessive self-heating of the vulcanized rubber treated by the devulcanizing method according to the invention. This degradation occurs for temperatures higher than 250° C. or 350° C. according to the types of rubber or when the vulcanized rubber undergoes very high shearings (of the order of $10^5$ $s^{-1}$). This is why, it is essential that after the step d), the temperature of the polymeric composite resulting from the shearing of the rubber be lower than the decomposition temperature of the rubber.

Furthermore, after this step d), the polymeric composite is flexible, hardly elastic and comparable to a mixture of unvulcanized rubber.

In an embodiment of the invention, the step d) comprises a shearing achieved in a tooling, for example a co-rotary twin-screw extruder, which is taken to a temperature ranging:

between 50° C. and 175° C., when the vulcanized rubber is a rubber of the first group detailed above, between 50° C. and 350° C., whether vulcanized rubber is a rubber of the second group detailed above.

In another embodiment of the invention, the non degrading mechanical treatment of the step d) comprises the following steps:

d1) achieving a first non degrading mechanical treatment on the kneaded rubber after step c);

d2) achieving a second non degrading mechanical treatment on the rubber obtained after step d1).

During step d1) takes place the priming of the rupture of the vulcanizing bonds. During step d2) the recombining of the free radicals resulting from the ruptures of bonds of step d1) takes place.

Advantageously, the rubber is subjected to during step d1) a shear rate ranging between $10^4$ $s^{-1}$ and $10^6$ $s^{-1}$, and during the step d2) a shear rate lower than than that of step d1), preferably ranging between $10^3$ $s^{-1}$ and $10^5$ $s^{-1}$.

The step d1) advantageously comprises a shearing and is achieved in third tooling taken to a temperature ranging:

between 50° C. and 250° C., preferably between 100° C. and 250° C., when the vulcanized rubber is a rubber of the first group detailed above, between 50° C. and 350° C., preferably between 150° C. and 350° C., when the vulcanized rubber is a rubber of the second group detailed above.

The third tooling may comprise a co-rotary twin-screw extruder of which the length of the screws ranges between 4 and 20 times the diameter of the screws, preferentially around 12 times the diameter of the screws.

The elements of the screws used are preferentially of type SME (Screw Mixing Element), TME (Turbine Mixing Element) or ZME (Zahnmischelement).

The step d2) advantageously comprises a shearing and is achieved in a fourth tooling taken to a temperature ranging:
between 50° C. and 200° C., preferably between 90° C. and 175° C., when the vulcanized rubber is a rubber of the first group detailed above,
between 50° C. and 300° C., preferably between 150° C. and 300° C., when the vulcanized rubber is a rubber of the second group detailed above.

The fourth tooling may comprise a co-rotary twin-screw extruder, of which the length of the screws advantageously ranges between 4 and 16 times the diameter of the screws, preferentially around 8 times the diameter of the screws.

The profiles of the screws used are mainly of KB type (Kneading Block). This type of element allows a homogenous distribution of the constraints within the material.

During this step d2), the rubber is maintained at a temperature where the brownien motion allows molecular recombinations of the free radicals formed in step d1). These molecular recombinations of the free radicals allow fixing the structure of the polymeric composite which will be obtained from this step d2).

The aptitude for the formulation of this polymeric composite is highly dependent on the molecular structures formed during these molecular recombinations.

In a preferred manner, after step d) and prior to the cooling step which is described in further detail hereinafter, the polymeric composite is conveyed and cooled in a fifth tooling taken to a temperature ranging between 10° C. and 60° C., preferably between 10° C. and 50° C., preferably of the order of 30° C. This allows blocking all the chemical reactions which were in progress during the step d). If this cooling is insufficiently efficient, non mastered molecular recombinations could occur and highly degrade the aptitude of reformulation of the polymeric composite.

The fifth tooling may comprise a co-rotary twin-screw extruder of which the length of the screws ranges between 4 and 16 times the diameter of the screws, preferentially 8 times the diameter of the screws.

The screw profiles may be similar to those used during step c), namely segments of type SE, SK or CME.

The fifth tooling advantageously comprises vents for allowing the discharge of the gases generated by the chemical reactions implemented during the step d2).

In an advantageous embodiment of the invention, the steps c) and d) (the step d possibly decomposing into steps d1) and d2)) of the method of the invention are achieved in a unique tooling, preferably a co-rotary twin-screw extruder, of which the profile of the screws is perfectly adapted so that the kneading and non degrading mechanical treatment steps of the method according to the invention can be carried out.

This is why in this embodiment of the invention, the first, second, third, fourth and fifth toolings described hereinabove are gathered into one single tooling which may comprise a co-rotary twin-screw extruder.

The ratio of the length of the screws on the diameter of the screws is advantageously chosen higher than 30.

In an embodiment of the invention, this ratio is equal to 60, and the screws of the extruder comprise the following portions:

a first portion for which the length of the screws is equal to around 4 times the diameter of the screws;
a second portion for which the length of the screws is equal to around 28 times the diameter of the screws;
a third portion for which the length of the screws is equal to around 12 times the diameter of the screws;
a fourth portion for which the length of the screws is equal to around 8 times the diameter of the screws;
a fifth portion for which the length of the screws is equal to around 8 times the diameter of the screws.

Thus, the vulcanized rubber which has just been ground is first of all introduced into the first portion, then kneaded in the second portion (step c), then subjected to a first shearing (step d1) carried out with a rate of shear of the order of $10^4$ $s^{-1}$ to $10^6$ $s^{-1}$ in the third portion, followed by a second shearing (step d2) carried out with a rate of shear of the order of $10^3$ $s^{-1}$ to $10^5$ $s^{-1}$ in the fourth portion and finally cooled in the fifth portion of the screws of the extruder.

In a preferred manner, the kneading step of the method according to the invention is achieved in a co-rotary twin-screw extruder designed in such a manner as that the profile of the screws is chosen so that the length of the portion of the screws dedicated to this kneading step represents around half the total length of the screws. In fact, the kneading step is an essential step of the method according to the invention.

In order to be able to precisely regulate the temperature within the co-rotary twin-screw extruder, the screws are housed in a sheath and the extruder further comprises:
a heater band surrounding the sheath and generating outer heating at a monitored temperature;
a plurality of ducts distributed in the sheath and in which the water circulates at a monitored temperature.

Moreover, in order to create areas of the extruder subjected to varied and monitored temperatures, it may be provided to divide the extruder into a plurality of areas (for example 15 areas each of length equal to 4 times the diameter of the screw in the case where the ratio of the length of the screws on that of the diameter of the screws is equal to 60), each area benefiting from outer heater and a monitored circulation of water so that the temperature prevailing within the area of the extruder be appropriate for the achievement of the step of the method according to the invention which is implemented in this area of the extruder.

The speed of rotation of the screws of the extruder may range between 15 and 300 r·min$^{-1}$, preferably of the order of 180 rev·min$^{-1}$.

For example, the output of the extruder preferably ranges between 60 kg/h and 150 kg/h. The output depends on the type of extruder.

Obviously, other equipment is well within the reach of the skilled person may be used instead of a co-rotary twin-screw extruder such as described above to implement the steps c) and d) of the method of devulcanizing a vulcanized rubber.

The method according to the invention may further comprise at least one of the following steps:
a cooling step, for example a cooling in a tank filled with water at a temperature ranging between around 15° C. and 35° C.;
a surface treatment step, for example talcing, a soap deposit, a silicone emulsion, or an adhesion promoter such as silane or a blocked isocyanate, or even a polyethylene film with a low melting point . . . ) or even any other surface treatment perfectly within the reach of the skilled person.

The method according to the present invention hardly requires any energy. The global energy consumption is of the order of 0.5 to 1 kWh/kg of treated vulcanized rubber.

A purpose of the present invention is also an installation for implementing the method of devulcanizing a devulcanized rubber described above.

In an embodiment of the invention, this installation comprises at least:
- a grinder;
- at least a co-rotary twin-screw extruder;

It may further comprise at least one of the following equipments:
- a storage unit;
- a vacuum pump or equipment for transporting pellets by suction or any other equivalent system;
- a filler;
- a cooling unit;
- a surface treatment application unit;
- a drying unit;
- a conditioning unit.

BRIEF DESCRIPTION OF THE DRAWINGS

The invention will be better understood using the detailed description exhibited here-below with reference to the accompanying drawing representing, by way of non limiting example, an embodiment of an installation implementing the method according to the invention and the sheath of a co-rotary twin-screw extruder used during this method.

DETAILED DESCRIPTION

Figure 1:
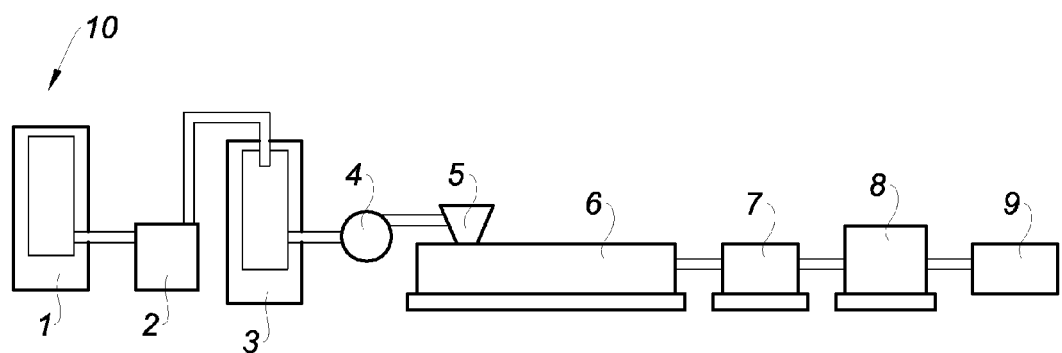
FIG. 1 represents in a schematic manner an installation implementing the method according to the invention.

The installation 10 comprises a first storage unit 1 in which a vulcanized rubber to be devulcanized is stored according to the method of the invention.

The vulcanized rubber to be devulcanized is channeled to a grinder 2. Once ground, it is channeled to a second storage unit 3, then by means of a vacuum pump 4 to a filler 5.

The filler 5 allows regulating the volume of ground vulcanized rubber which enters in the co-rotary twin-screw extruder 6 which has been designed so that the steps of kneading and shearing of the devulcanizing method according to the invention be achieved thereto.

At the output of the co-rotary twin-screw extruder 6, it is obtained a polymeric composite which is channeled towards a unit for cooling and applying a surface treatment 7, regulated at a temperature ranging between around 15 and 35° C. and in which the polymeric composite is conveyed.

The surface treatment comprises a deposit of talc or an aqueous solution of soap, etc.

Then, the polymeric composite covered with talc or soap is channeled towards a drying unit 8 which comprises air knives. The temperature of the air is in the range of 30 to 40° C. The polymeric composite describes a complex travel in this drying unit 8 and the drying time thereof is in the range of 45 to 50 minutes.

After the drying, the polymeric composite is stored in a conditioning unit 9.

Figure 2:
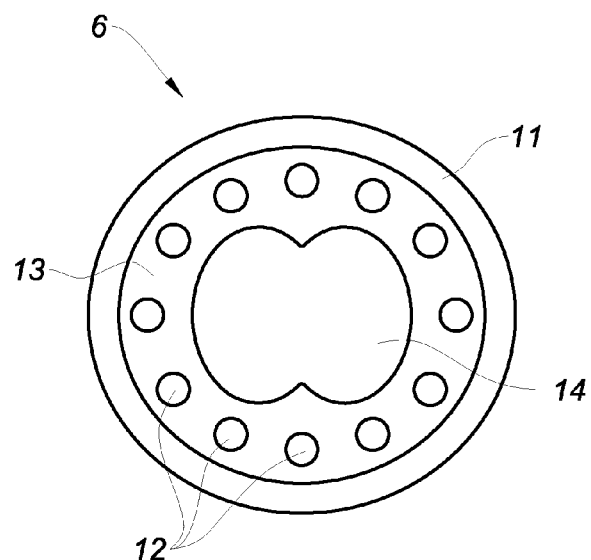
FIG. 2 is a cross-sectional view of the sheath of a co-rotary twin-screw extruder which may be used for the devulcanizing method according to the invention.

On FIG. 2 is represented the sheath 13 of an extruder 6 which comprises a heater band 11 surrounding the sheath 13, and in which are housed the two screws 14 and a plurality of ducts 12. The ducts 12 are intended for a water circulation in order to cool the extruder 6.

Experimental Part:

The devulcanizing method according to the invention has been implemented with the following vulcanized rubbers:
1) polyisoprene (IR);
2) natural rubber (NR);
3) ethylene-propylene-diene monomer rubber (EPDM) with a hardness of 80 ShA;
4) ethylene-propylene-diene monomer rubber (EPDM) with a hardness of 40 ShA;
5) isobutene isoprene rubber (IIR).

The tooling used was a co-rotary twin-screw extruder of which the speed of the screws is indicated in the last line of the table 2 here-below according to the considered rubber 1) to 5).

Moreover in this table 2 are detailed, according to the considered rubber 1) to 5), the temperatures of the co-rotary twin-screw extruder according to the progress of the method according to the invention, namely:
- before step c);
- during step c);
- during step d1);
- during step d2).

TABLE 2

Temperatures of the steps of the method according to the invention and screw speed according to the rubber to be devulcanized.

| | Temperature (° C.) of the twin-screw extruder | | | | |
|---|---|---|---|---|---|
| | IR | NR | EPDM hardness 80 ShA | EPDM hardness 40 ShA | MR |
| Before step c) | 90 | 160 | 280 | 270 | 100 |
| Step c) | 160 | 185 | 320 | 300 | 260 |
| Step d1) | 180 | 190 | 310 | 260 | 260 |
| Step d2) | 115 | 145 | 260 | 240 | 230 |
| Screw speed (rev/min) | 225 | 200 | 250 | 300 | 275 |

The example here-below illustrates the use of around 20% in weight of a polymeric composite obtained from a method according to the invention in a rubber formulation.

This rubber formulation corresponded to a standard formulation of the range of vulcanized rubbers commercialized by the PLYMOUTH FRANCAISE company.

The starting raw elastomer (or rubber) was polyisoprene.

The polymeric composite was obtained by applying the method according to the invention to a sample of the formulation A such as described in table 3 here-below after vulcanization.

In order to do this, a sample of the formulation A has been subjected to the devulcanizing method according to the invention which has been achieved in a co-rotary twin-screw extruder of which the technical features were the following:

The ratio of the length of the screws on the diameter of the screws was equal to 60. The rotational speed of the screws was of 185 rev·min$^{-1}$.

The extruder comprised the following portions:
- a first portion for which the length of the screws was equal to 4 times the diameter of the screws;
- a second portion for which the length of the screws was equal to 28 times the diameter of the screws;
- a third portion for which the length of the screws was equal to 12 times the diameter of the screws;

a fourth portion for which the length of the screws was equal to 8 times the diameter of the screws;

a fifth portion for which the length of the screws was equal to 8 times the diameter of the screws;

The sample of the formulation was first of all introduced into the first portion of the extruder which was at a temperature of 85° C.

Then, the sample was kneaded in the second portion of the extruder (step c)), of which the input temperature of this second portion of the extruder was of 200° C. and the output temperature of this second portion of the extruder was of 150° C.

The sample was then subjected to a first shearing carried out with a rate of shear in the range of $10^4$ s$^{-1}$ to $10^6$ s$^{-1}$ in the third portion of the extruder which was at a temperature of 165° C. (step d1), followed by a second shearing carried out with a rate of shear in the range of $10^3$ s$^{-1}$ to $10^5$ s$^{-1}$ in the fourth portion of the extruder which was at a temperature of 125° C. (step d2).

The sample was finally cooled in the fifth portion of the extruder which was at a temperature of 30° C. in such a manner as to obtain a polymeric composite.

The formulation B, which contained 35 pc (percent of rubber) of this polymeric composite thus obtained, exhibited a weight composition identical to formulation A.

The conditions of mixing, shaping and vulcanization used for "formulation A" and for "formulation B" were strictly identical.

However, in order to obtain exactly the same mechanical performances with formulations A and B, the vulcanization system (accelerators+sulfur) and the capacity factor had to be adjusted.

Table 3 here-below summarizes:

The compositions of respectively:

2$^{nd}$ column: formulation A;

3$^{rd}$ column: formulation B which comprises 35.25 g of polymeric composite;

4th column: formulation B but expressed by distributing the constituents of the 35.25 g of polymeric composite in the different constituents of the rubber of formulation A.

The ratio expressed in % of sulfur/elastomer for formulations A and B.

The ratio expressed in % of accelerator/elastomer for formulations A and B.

The ratio expressed in % of fillers/elastomer for formulations A and B.

TABLE 3

Compositions of the formulations A and B

|  | Formulation A (g) | Formulation B with polymeric composite (g) | Formulation B with distribution of the constituents of the polymeric composite (g) |
|---|---|---|---|
| elastomer | 100.00 | 76.92 | 97.21 |
| Polymeric composite |  | 35.25 |  |
| Fillers and additives | 50.00 | 38.46 | 52.67 |
| sulfur | 1.25 | 0.96 | 1.26 |
| accelerators | 1.50 | 1.15 | 1.26 |
| Total | 152.75 | 152.75 | 152.75 |
| Sulfur/elastomer ratio | 1.25% | — | 1.30% |

TABLE 3-continued

Compositions of the formulations A and B

|  | Formulation A (g) | Formulation B with polymeric composite (g) | Formulation B with distribution of the constituents of the polymeric composite (g) |
|---|---|---|---|
| Accelerators/elastomer ratio | 1.50% | — | 1.67% |
| Fillers/elastomer ratio | 5.00% | — | 5.42% |

An ageing composed of the 3 following cycles: machine wash at 90° C.; followed by drying in an oven for 6 hours at 120° C. has been achieved on formulations A and B.

The following measurements were carried out on formulations A and B:

The measurement of the module at 100%;

The measurement of the elongation at break;

The measurement of the percentage of loss of module after an ageing such as detailed above.

The measurement of the percentage of the tear resistance.

Table 4 here-below exhibits the compared mechanical features of the two formulations A and B:

TABLE 4 characterization of formulations A and B

| Features | Formulation A | Formulation B |
|---|---|---|
| Module at 100% | 1.1 MPa | 1.1 MPa |
| Elongation break | 650% maximum | 650% minimum |
| % loss of the module after ageing | 30% maximum | 10% to 30% maximum |
| % tear resistance | 400% minimum | 400% minimum |

It has been noted from table 4 that the physical features of module at 100%, of elongation at break and the percentage of tear resistance are similar for formulations A and B. And regarding the percentage of loss of module after ageing, that of the formulation B (namely according to the invention) is even a bit better than that of formulation A.

Also, the UV resistances of the two formulations A and B have been evaluated to be compared: they are also similar.

Thus, these results show that the substitution of a virgin rubber mixture by a polymeric composite obtained according to the method of the invention in a rubber formulation intended to be vulcanized, and thus to the amount of 20% in weight, changes nothing to the physical properties of the final vulcanized rubber.

In other words, this example emphasizes the fact that the polymeric composite obtained according to the method of the invention which constitutes a method for recycling a vulcanized rubber may be used by replacing a mixture of virgin rubber in a new mixture to be vulcanized, and thus without altering the mechanical and physical properties of the final achieved product.

In addition, it has been emphasized that the damping power and the compression resistance of a formulation of vulcanized rubber were not modified by introducing 30 to 40 per of polymeric composite obtained according to the method of the invention in said formulation.

The polymeric composite according to the invention also has, owing to its molecular structure, a strong aptitude to incorporating fillers such as rubber crumb. Thus, it is possible to increase the rate of incorporation of the polymeric composite and the crumb in a rubber formulation. The incorporation of this rubber crumb allows to significantly lower the cost of the raw material.

Table 5 here-below exhibits two formulations of which the mechanical and elastic properties (module, elongation at break, ageing, UV resistance, hardness . . . ) are similar.

The formulation C has been achieved with mixtures of virgin rubbers.

Formula D incorporates 70 per of the polymeric composite obtained according to the method of the invention and 42 per of rubber crumb.

TABLE 5 composition of formulations C and D.

| Component | Formulation C | Formulation D with polymeric composite and crumb | Formulation D with distribution of the constituents of the polymeric composite |
|---|---|---|---|
| Natural rubber | 42.00 | 26.90 | 35.65 |
| SBR | 14.00 | 8.97 | 11.88 |
| Polymeric composite | | 25.12 | |
| Crumb | | 15.07 | 15.07 |
| Sulfur | 1.40 | 0.90 | 1.19 |
| Accelerator | 0.85 | 0.54 | 0.71 |
| Filler and additives | 41.75 | 22.50 | 35.50 |
| Total | 100.00 | 100.00 | 100.00 |
| Sulfur/elastomer ratio | 2.50% | — | 2.45% |
| Accelerators/elastomer ratio | 1.52% | — | 1.50% |
| Fillers/elastomer ratio | 74.6% | — | 106.4% |

The invention claimed is:

1. A method of devulcanizing a vulcanized rubber comprising:
    a) providing at least one vulcanized rubber;
    b) grinding the vulcanized rubber into chips or aggregates;
    c) kneading at a low rate of shear ranging from about 100 $s^{-1}$ to about 500 $s^{-1}$ the ground rubber obtained from step b) in such a manner as to homogenize it in size of aggregates and temperature;
    d) kneading the product of step (c) to a high rate of shear ranging between $10^3$ $s^{-1}$ and $10^6$ $s^{-1}$ thereby obtaining a polymeric composite.

2. The devulcanizing method according to claim 1, wherein the vulcanized rubber belongs to a first group constituted by the rubbers which become degraded starting from temperatures of the order of 250° C.

3. The devulcanizing method according to claim 1, wherein the vulcanized rubber belongs to a second group constituted by the rubbers which do not become degraded when they are subjected to temperatures in the range of 250° C. to 350° C.

4. The devulcanizing method according to claim 3, wherein after step b) of grinding and prior to step c) of kneading, the vulcanized rubber is subjected in a first tooling to a temperature ranging:
    between 25° C. and 200° C., when the vulcanized rubber is a rubber of the first group,
    between 25° C. and 350° C., when the vulcanized rubber is a rubber of the second group.

5. The devulcanizing method according to claim 3, wherein step c) of kneading is achieved in a second tooling of which: the temperature of the tooling ranges between 100° C. 250° C., when the vulcanized rubber is a rubber of the first group, the temperature of the tooling ranges between 100° C. and 350° C., when the vulcanized rubber is a rubber of the second group.

6. The devulcanizing method according to claim 3, wherein the step d) is achieved in a tooling taken to a temperature ranging:
    between 50° C. and 175° C., when the vulcanized rubber is a rubber of the first group,
    between 50° C. and 350° C., when the vulcanized rubber is a rubber of the second group.

7. The devulcanizing method according to claim 6, wherein the step d) comprises the following steps:
    d1) a first non-degrading mechanical treatment on the kneaded rubber after step c) by subjecting it in a third tooling to a shear rate ranging between $10^4$ $s^{-1}$ and $10^6$ $s^{-1}$ and of which the temperature of the third tooling ranges:
        between 50° C. and 250° C., when the vulcanized rubber is a rubber of the first group,
        between 50° C. and 350° C., when the vulcanized rubber is a rubber of the second group;
    d2) a second non-degrading mechanical treatment on the rubber obtained after step d1) by subjecting it in a fourth tooling to a shear rate ranging between $10^3$ $s^{-1}$ and $10^5$ $s^{-1}$ and of which the temperature of the fourth tooling ranges:
        between 50° C. and 200° C., when the vulcanized rubber is a rubber of the first group,
        between 50° C. and 300° C., when the vulcanized rubber is a rubber of the second group.

8. The devulcanizing method according to claim 1, wherein after step d) the polymeric composite is conveyed and cooled in a fifth tooling taken to a temperature ranging between 10° C. and 60° C.

9. The devulcanizing method according to claim 1, wherein it further comprises at least one of the following steps:
    a cooling step;
    a surface treatment step chosen from the group constituted by the talcing, the soap deposit, a silicone emulsion, an adhesion promoter or a polyethylene film with a low melting point.

* * * * *